(12) United States Patent
Kesti et al.

(10) Patent No.: US 12,024,753 B2
(45) Date of Patent: Jul. 2, 2024

(54) HIGH STRENGTH STEEL PRODUCT AND METHOD OF MANUFACTURING THE SAME

(71) Applicant: SSAB TECHNOLOGY AB, Stockholm (SE)

(72) Inventors: Vili Kesti, Raahe (FI); Ari Hirvi, Raahe (FI); Tommi Liimatainen, Raahe (FI); Mikko Hemmilä, Raahe (FI); Pasi Suikkanen, Raahe (FI); Erik Nymann, Borlänge (SE); Martin Lind, Borlänge (SE); Robin Nilsson, Borlänge (SE); Juha Pyykkönen, Raahe (FI)

(73) Assignee: SSAB TECHNOLOGY AB, Stockholm (SE)

( * ) Notice: Subject to any disclaimer, the term of this patent is extended or adjusted under 35 U.S.C. 154(b) by 0 days.

(21) Appl. No.: 18/001,279

(22) PCT Filed: May 20, 2021

(86) PCT No.: PCT/EP2021/063421
§ 371 (c)(1),
(2) Date: Dec. 9, 2022

(87) PCT Pub. No.: WO2021/254719
PCT Pub. Date: Dec. 23, 2021

(65) Prior Publication Data
US 2023/0235425 A1    Jul. 27, 2023

(30) Foreign Application Priority Data
Jun. 16, 2020 (EP) .................................. 20180300

(51) Int. Cl.
B32B 15/01   (2006.01)
B32B 15/04   (2006.01)
(Continued)

(52) U.S. Cl.
CPC .............. *C21D 9/52* (2013.01); *B32B 15/013* (2013.01); *B32B 15/015* (2013.01); *B32B 15/04* (2013.01);
(Continued)

(58) Field of Classification Search
CPC ........ C21D 2211/002; C21D 2211/005; C21D 1/18; C21D 9/52; C21D 9/0081;
(Continued)

(56) References Cited

U.S. PATENT DOCUMENTS

2015/0099139 A1*  4/2015  Rijkenberg ..........  C21D 8/0226
                                                              72/47

FOREIGN PATENT DOCUMENTS

CN    109957716    7/2019
EP    2835440     2/2015
(Continued)

OTHER PUBLICATIONS

International Search Report and Written Opinion were mailed on Aug. 10, 2021 by the International Searching Authority for International Application No. PCT/EP2021/063421 filed on May 20, 2021 and published as WO2021/254719 (Applicant—SSAB Technology AB) (11 pages).

*Primary Examiner* — Michael E. La Villa
(74) *Attorney, Agent, or Firm* — Ballard Spahr LLP (57) ABSTRACT

A hot-rolled strip steel product is described having a chemical composition consisting of, in terms of weight percentages (wt. %): 0.030%-0.10% C, 0%-1.10% Si, 0.50%-2.0% Mn, <0.020% P, <0.010% S, <0.010% N, 0%-0.60% Cr, 0%-0.20% Ni, 0%-0.25% Cu, 0%-0.30% Mo, 0%-0.15% Al, 0%-0.10% Nb, 0.10%-0.30% V, <0.020% Ti, 0%-0.0010% B, remainder being Fe and inevitable impurities, wherein the hot rolled strip steel product has a a microstructure comprising, in terms of volume percentages (vol. %), ferrite≥90, (Continued)

wherein the ferrite structure comprises bainite, at least 50% of polygonal ferrite and at most 10% quasi-polygonal ferrite, and wherein the steel strip product has an average hole expansion ratio≥50%, a yield strength (Rp0.2%) longitudinal to rolling direction of ≥660 MPa and a tensile strength≥760 MPa.

15 Claims, 2 Drawing Sheets

(51) Int. Cl.
| | |
|---|---|
| *B32B 15/18* | (2006.01) |
| *C21D 1/18* | (2006.01) |
| *C21D 6/00* | (2006.01) |
| *C21D 8/02* | (2006.01) |
| *C21D 9/00* | (2006.01) |
| *C21D 9/46* | (2006.01) |
| *C21D 9/52* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/28* | (2006.01) |
| *C22C 38/32* | (2006.01) |
| *C22C 38/38* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C23C 2/02* | (2006.01) |
| *C23C 2/06* | (2006.01) |
| *C23C 2/40* | (2006.01) |
| *C23C 28/00* | (2006.01) |
| *C23C 28/02* | (2006.01) |
| *C23C 30/00* | (2006.01) |

(52) U.S. Cl.
CPC ............ *B32B 15/043* (2013.01); *B32B 15/18* (2013.01); *C21D 1/18* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0247* (2013.01); *C21D 8/0263* (2013.01); *C21D 9/0081* (2013.01); *C21D 9/46* (2013.01); *C22C 38/001* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/0224* (2022.08); *C23C 2/06* (2013.01); *C23C 2/40* (2013.01); *C23C 28/025* (2013.01); *C23C 28/3225* (2013.01); *C23C 30/00* (2013.01); *C23C 30/005* (2013.01); *C21D 2211/002* (2013.01); *C21D 2211/005* (2013.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/26* (2015.01)

(58) Field of Classification Search
CPC .......... C21D 9/46; C21D 6/004; C21D 6/005; C21D 6/008; C21D 8/0205; C21D 8/0226; C21D 8/0247; C21D 8/0263; B32B 15/013; B32B 15/015; B32B 15/04; B32B 15/043; B32B 15/18; C22C 38/001; C22C 38/04; C22C 38/06; C22C 38/08; C22C 38/12; C22C 38/14; C22C 38/16; C22C 38/24; C22C 38/38; C22C 38/44; C22C 38/46; C22C 38/48; C22C 38/50; C22C 38/58; C22C 38/02; C22C 38/18; C22C 38/20; C22C 38/22; C22C 38/28; C22C 38/32; C22C 38/40; C22C 38/42; C22C 38/54; C23C 2/02; C23C 2/0224; C23C 2/06; C23C 2/40; C23C 28/3225; C23C 28/025; C23C 30/00; C23C 30/005; Y10T 428/26; Y10T 428/12799; Y10T 428/12951; Y10T 428/12958; Y10T 428/12965; Y10T 428/12972
See application file for complete search history.

(56) References Cited

FOREIGN PATENT DOCUMENTS

| | | |
|---|---|---|
| EP | 3330394 | 6/2018 |
| JP | 2007/063668 | 3/2007 |
| JP | 2013/224460 | 10/2013 |
| WO | WO 2013/167572 | 11/2013 |

* cited by examiner

HIGH STRENGTH STEEL PRODUCT AND METHOD OF MANUFACTURING THE SAME

CROSS-REFERENCE TO RELATED APPLICATIONS

This application is a U.S. National Phase Application of International Application No. PCT/EP2021/063421, filed May 20, 2021, which claims priority to European Application No. 20180300.4, filed Jun. 16, 2020, each of which are hereby incorporated by reference in their entirety.

TECHNICAL FIELD

The present invention relates to a high strength strip steel product, suitable for example for automotive industry applications, exhibiting an excellent average hole expansion ratio (HER), excellent elongation and high formability. The present invention further relates to a method of manufacturing the high strength strip steel product.

BACKGROUND OF THE INVENTION

For environmental purposes and in order to fulfil safety regulations, the automotive industry requires a steel product that is thin and has a high strength. It is desirable to reduce the negative effects on the environment and at the same time to ensure passenger safety as well as good driving performance. By reducing the fuel consumption and thereby reducing emission of greenhouse gases, the environment will be less negatively influenced. This can be achieved by using thinner and stronger steel products in the automotive industry whereby vehicles of lighter weight may be produced. Hot-rolled steel sheets are therefore being developed to meet these requirements.

Thinner steel products need to be of high strength for the safety of the passengers. Furthermore, there is a need for a steel product, which combines high strength with high formability and stretch flangeability. High formability is needed in order to more easily form e.g. a chassis to a desired form. High strength may, however, affect the formability and the stretch flangeability of steel sheets.

High strength steel sheets are sensitive to edge cracking during stretch flanging, which can be problematic. A common test for determining the stretch flanging is an average hole expansion test. A high average hole expansion ratio characterizes good formability and good stretch flangeability of steel sheets with high strength. High strength steel with high stretch flangeability and thus a high average hole expansion ratio is requested, as well as a method of producing such a steel in a cost effective manner.

SUMMARY OF THE INVENTION

The object of the present invention is to solve the problem of providing a high strength steel product exhibiting an excellent average hole expansion ratio, elongation, high formability and high tensile strength. The objective is achieved by the combination of specific alloy design with cost-efficient manufacturing methods, which generates a mainly ferritic microstructure.

In a first aspect, the present invention provides a hot-rolled strip steel product having a chemical composition consisting of, in terms of weight percentages (wt. %):

C 0.030-0.10, preferably 0.045-0.080
Si 0-1.10, preferably 0.0050-0.80, more preferably 0.0050-0.60
Mn 0.50-2.0, preferably 0.70-1.9, more preferably 0.80-1.8
P<0.020
S<0.010, preferably <0.0030
N<0.010
Cr 0-0.60, preferably 0-0.55, more preferably 0-0.50
Ni 0-0.20
Cu 0-0.25, preferably 0-0.10
Mo 0-0.30, preferably 0.050-0.25, more preferably 0.050-0.22
Al 0-0.15, preferably 0.015-0.070
Nb 0-0.10, preferably 0.010-0.080
V 0.10-0.30, preferably 0.10-0.25, more preferably 0.10-0.22
Ti<0.020
B 0-0.0010, preferably 0-0.00050 remainder being Fe and inevitable impurities, wherein the hot rolled strip steel product has a microstructure comprising, in terms of volume percentages (vol. %), ferrite≥90, preferably ≥95, more preferably ≥98, wherein the ferrite structure comprises bainite, at least 50% of polygonal ferrite and at most 10% quasi-polygonal ferrite, and wherein the steel strip product has an average hole expansion ratio≥50%, preferably ≥60 and more preferably ≥70%
a yield strength ($Rp_{0.2\%}$) longitudinal to rolling direction of ≥660 MPa and a tensile strength>760 MPa.

In a second aspect, the present invention provides a method for manufacturing the steel strip according to any of the preceding claims comprising the following steps of
providing a steel slab having the chemical composition according to claim 1;
heating the steel slab to the austenitizing temperature of 1200-1350° C.;
hot-rolling to a desired thickness at a temperature in the range of Ar3-1300° C., wherein the finish rolling temperature is in the range of 850-1050° C., preferably 910-980° C., more preferably 930-970° C.;
air cooling for 0.5-15 seconds and preferably for 1-10 seconds;
accelerated cooling to 590-680° C., preferably to 600-640° C. and
coiling the hot-rolled strip.

There may also be a short air cooling period between end of accelerated cooling and start of coiling.

It has been found that the addition of V increases the strength of the steel product. V forms carbides and nitrides, which contribute to the strength of the steel product.

High strength of the steel product is mainly a result of precipitation strengthening of e.g. vanadium alloying and small grain size, while high average hole expansion ratio is a result of clean steel metallurgy and small deviation in micro hardness in different phases in the microstructure. With the combination of elements and the alloying strategy, a high strength steel with great average hole expansion properties is obtained.

The steel strip product may have an average ferrite grain size<10 μm.

In the steel product disclosed herein, if the amount of Ti is more than or equal to 0.005 and less than 0.02%, the amount of N may be less than 100 ppm and preferably less than 60 ppm. A steel product with high average hole expansion ratio and high strength is thereby achieved.

The steel product disclosed herein may have an average hole expansion ratio of ≥60% and/or a tensile strength of ≥790 MPa. The tensile strength may preferably be ≥800 MPa. An upper limit of the tensile strength may be 960 MPa in order to keep the average hole expansion ratio at an acceptable level. Further, the steel product may have an average hole expansion ratio of ≥50%, preferably ≥65%, or preferably ≥70% or more preferably ≥80%. A high average hole expansion ratio and tensile strength are important features to achieve a strip steel product suitable for use in the automotive industry. A high strength steel product is obtained with the steel disclosed herein and the average hole expansion ratio is kept at a high level. The steel product disclosed herein may have a yield strength ($Rp_{0.2\%}$) longitudinal to the rolling direction of ≥700 MPa. An upper limit of the yield strength ($Rp_{0.2\%}$) in the longitudinal direction, i.e. in the rolling direction, may be 820 MPa in order to keep the average hole expansion ratio at an acceptable level.

The steel product may have a total elongation≥13%.

The steel product disclosed herein may have a thickness of 1.5-8.0 mm, preferably 1.5-6.0 mm.

The sum of Si, Mn, Ni and Cr may be, in terms of weight percentages (wt. %), in the range of 1.5%-2.5% and preferably 1.65%-2.35%. The phase transformation from austenite to ferrite occurs slower and austenite is more stable at lower temperatures when larger amounts of Mn, Ni and/or Cr are present. Mn, Ni and Cr can thus be used to adjust the phase transformation to a suitable temperature range. Si provides solid solution strengthening and prevents cementite formation.

The sum of Nb, V and Ti may be, in terms of weight percentages (wt. %), 0.060%-0.40%, and preferably 0.15%-0.35%. The amount of Nb, V and Ti provide precipitation strengthening via carbide and nitride precipitation and can also be used to adjust the phase transformation temperature range.

A combined content of Cu+Ni may be 0.040%-0.60% to increase solid solution strengthening, weldability and weather resistance properties. Preferably the combined content for Cu+Ni may be 0.10%-0.25%.

The maximum carbon content may be $$C \leq a + Nb*(12.01/92.91) + V*(12.01/50.94) + Ti*(12.01/47.87) + Mo*(0.5*(12.01/95.94))$$

wherein all elements are in weight percentages (wt %) and constant a is tolerance for carbon, wherein the tolerance a may be 0.035, or preferably 0.025, or more preferably 0.016.

The minimum carbon content may be $$C > Nb*(12.01/92.91) + V*(12.01/50.94) + Ti*(12.01/47.87) + Mo*(0.5*12.01/95.94) - b,$$

wherein all elements are in weight percentages (wt %) and constant b is tolerance for carbon, wherein the tolerance b may be 0.015, or preferably 0.012, or more preferably 0.01.

In this way, it is ensured that the amount of carbon is high enough to allow sufficient precipitation strengthening, and low enough to prevent excessive carbon-rich areas (cementite, M/A-islands, for example) from forming.

In the steel product disclosed herein, the average size of VC precipitates may be <10 nm and preferably <6 nm. This improves the strength of the steel and has a high impact on the steel product.

The ferrite may comprise at most 10% of quasi-polygonal ferrite and at least 50% of polygonal ferrite and preferably more than 80% polygonal ferrite. The microstructure may also comprise bainite in amounts of less than 10% and preferably less than 5%. The microstructure of the steel product may, apart from ferrite, comprise up to 10% of other phases and structures, such as pearlite, Martensite/Austenite (M/A) islands and/or cementite, such that the total content of microstructural features adds up to 100%. The content of M/A islands and pearlite may in some embodiments be up to 5%. In an embodiment, the microstructure comprises at least 95% ferrite, the remainder being pearlite and M/A islands. The sum of pearlite and M/A islands may be <3%. Carbon-rich areas, such as M/A islands, are preferably to be avoided. Preferably, the steel product is free from residual austenite, or comprises at most 0.5% of residual austenite. Austenite is preferably only present as M/A-islands.

The steel product may be galvanized. This improves the corrosion resistance of the steel product. The galvanizing process may also increase the strength of the steel. The steel product may, for example, be galvanized by hot-dip galvanizing, although it is also possible to use other galvanizing techniques. The steel product may be continuously hot-dip galvanized.

In the method as disclosed herein, the accelerated cooling may be continuous.

In the method disclosed herein, the air cooling may be performed before the accelerated cooling.

The accelerated cooling rate may be may be 25° C./s-350° C./s, or it may be 25-150° C./s or it may be 150-350° C./s.

Further advantages and advantageous features of the invention are disclosed in the following description.

Definitions

The term "steel" is defined as an iron alloy containing carbon (C).

The term "strip steel product" as used in this document is intended to mean any rolled steel product having a thickness up to and including 10 mm, preferably 1.5-8.0 mm and more preferably 1.5-6.0 mm.

The term "ultimate tensile strength" (UTS, Rm) refers to the limit, at which the steel fractures under tension, thus the maximum tensile stress.

The term "yield strength" (YS, $Rp_{0.2}$) refers to 0.2% offset yield strength defined as the amount of stress that will result in a plastic strain of 0.2%. Test results presented here are from samples cut along the rolling direction (longitudinal) from the center part of the strip, and thus refer to the yield strength as measured longitudinal to the rolling direction.

The term "total elongation" (TE) refers to the percentage by which the material can be stretched before it breaks; a rough indicator of formability, usually expressed as a percentage over a fixed gauge length of the measuring extensometer. Two common gauge lengths are 50 mm ($A_{50}$) and 80 mm ($A_{80}$).

"Hole expansion ratio" characterizes formability and stretch flangeability of steel sheets with high strength. The test is conducted by expanding a punched hole by pushing a conical punch through the punched hole. When measuring the hole expansion ratio the test is conducted three times and an average value is calculated. Thus, an average hole expansion ratio is measured. A more detailed description is disclosed in the Example part.

The alloying content of steel together with the processing parameters determine the microstructure, which in turn determines the mechanical properties of the steel.

The alloying elements that have been disclosed as being present in an amount of 0 to X weight-% are optional alloying elements and may be present in an amount of 0 weight-% up to and including the maximum amount X weight-%.

The alloying elements that have been disclosed as being present in an amount of <X % are optional alloying elements and may be present in an amount of 0 weight-% up to and not including the amount of X weight-%.

The difference between residual contents and inevitable impurities is that residual contents are controlled quantities of alloying elements, which are not considered to be impurities. A residual content as normally controlled by an industrial process does not have an essential effect upon the alloy.

$GS_F$ is measured average grain size of the ferrite phase.

Rolling parameters: t=thickness/time, FRT=finish rolling temperature, i.e. the temperature when hot rolling ends, CT=coiling temperature.

The Ar3 is the start transformation temperature for austenite-to-ferrite transformation upon cooling of the steel.

DETAILED DESCRIPTION OF THE INVENTION

Alloy design is one of the first issues to be considered when developing a steel product with targeted mechanical properties. In the following, the chemical composition according to the present invention is described in more details, wherein % of each element refers to weight percentage.

Carbon C is Used in the Range of 0.030%-0.10%.

C alloying increases the strength of steel by solid solution and precipitation strengthening, and hence C content contributes to the strength level. An excessive amount of C may promote cementite formation, which may be detrimental to average hole expansion ratio. Further, C may have detrimental effects on weldability and impact toughness.

C is used in the range of 0.030%-0.10%, preferably, in the range of 0.045%-0.080%.

Silicon Si is used in the range of 0%-1.1%.

Si alloying enhances strength by solid solution strengthening. Further, Si retards the formation of cementite and pearlite and suppresses the formation of coarse carbides, which may impair stretch-flange formability. A low Si content is desired to reduce rolling loads and to avoid scale issues which can impair fatigue properties of the steel product.

Si is used in the range of 0%-1.1%. Preferably, Si is used in the range of 0.0050%-0.80%, and more preferably 0.0050%-0.60%. The amount of Si may be <0.50%.

In some embodiments, Si may be added in an amount of >0.50%. This may be a preferred due to that Si contributes to solid solution strengthening and Si prevents cementite formation. Thus, Si may in some embodiments be used in the amount>0.50%-1.1%.

Manganese Mn is Used in the Range of 0.50%-2.0%.

Mn provides solid solution strengthening and suppresses the ferrite transformation temperature and ferrite transformation rate. Mn may also affect the precipitation of carbides and/or carbo-nitrides.

When Mn is added in a lower amount, the segregation during casting is limited and the mcirostructure is more homogenous. Therefore the mechanical properties are homogenous.

An excess of Mn may deteriorate formability. In addition, increasing Mn levels may increase segregation during continuous casting resulting in an inhomogeneous microstructure.

However, certain amounts of Mn are needed in order to achieve the correct strength and microstructure. Mn is used in the range of 0.50%-2.0%. Preferably, Mn is used in the range of 0.70%-1.9%, and more preferably 0.80%-1.8%.

Phosphorus P May be Used in an Amount of <0.020%.

P is a solid solution strengthening element. At high levels, P segregation will impair stretch-flange formability as well as weldability and impact toughness. Due to these negative effects, P is an unwanted element in these types of steels.

P may be used in an amount of <0.020%. Preferably, P may be used in an amount of <0.010%.

Sulphur S May be Used in an Amount of <0.010%.

A low sulfur content is beneficial for formability. Thus, a low content of S is good for a high average hole expansion ratio.

S may be used in an amount of <0.010%. Preferably, S may be used in an amount of <0.0030%.

Nitrogen N May be Used in Amount of <0.010%.

Generally, N levels need to be below 100 ppm to prevent excessive aging. Furthermore, nitrogen forms nitrides together with Ti, which reduce the amount of Ti available for precipitation strengthening. If the amount of Ti is more than or equal to 0.005 and less than 0.02%, the amount of N may be less than 100 ppm, preferably less than 60 ppm and more preferably less than 50 ppm. A too high N content will impair cold-stretch and stretch-flange formability. N content may be <0.010%.

Chromium Cr May be Used in the Range of 0%-0.60%.

Preferably Cr is not added, but it may be present e.g. from scrap raw material. In order to achieve even strength levels along the strip and good formability properties, i.e. good average hole expansion ratio, chromium alloying is not essential and not needed. Chromium alloying also increases cost of the alloy.

Cr suppress the ferrite formation similar as Mn. Thus, Cr can partially replace Mn in order to improve the center line segregation which might be present at elevated Mn levels. Cr can also improve the strength of the material.

Cr may be used in the range of 0%-0.60%. Preferably, Cr may be used in the range of 0%-0.55%. More preferably, the Cr content is 0%-0.50%. Cr may be used in the range of 0%-0.30%, 0%-0.20%, or in the range of 0%-0.10%.

Nickel Ni May be Used in an Amount of 0%-0.20%.

Ni may be optionally added. If not added intentionally, it may be present in the amounts of 0-0.20% from scrap raw material. Higher levels than 0.20% of Ni may improve toughness, but would also increase the cost of the steel.

Ni may be added intentionally to increase the formability and ductility of the steel product. Further, the addition of Ni may improve the weldability of the steel product.

Ni may be used in the range of 0-0.20%, preferably Ni may be used in the range of 0.05-0.20%, more preferably Ni may be used in the range of 0.080-0.18%. Another range of Ni which may be used is 0.10-0.15%. In some embodiments, Ni content may be for example at least 0.01%.

Copper Cu May be Used in the Range of 0%-0.25%.

Cu may be present as result of scrap raw material based metallurgy, if not intentionally added. If the steel has high amounts of Cu, Ni is needed in order to prevent surface defects from arising during hot rolling. As a general rule, a Ni content of at least 30% of the Cu content is needed to prevent the defects, and preferably even more. Ni alloying may be needed when the Cu content is more than 0.20%.

Cu may be used in the range of 0%-0.25%. Preferably, Cu may be used in the range of 0%-0.20% and more preferably 0%-0.10%. In some embodiments, Cu content may be for example at least 0.01%.

Molybdenum Mo May be Used in the Range of 0%-0.30%.

Mo alloying improves impact strength, low-temperature toughness and tempering resistance. Molybdenum may be used to increase strength, and it is preferable to the steel product disclosed herein. Mo alloying may also decrease strength deviation along the length of the steel strip. Increased Mo levels may mildly increase hot rolling forces. Mo is also a carbide former and may form molybdenum carbides or complex carbides together with Ti and/or V and/or Nb.

Mo may be used in the range of 0%-0.30%, more preferably 0.050%-0.25% and more preferably 0.10-0.22%.

If Mo alloying is intentionally used to promote precipitation strengthening, Mo may be used in the range up to 0.30%. Preferably, Mo may be used in the range of 0.050%-0.25%, and more preferably 0.10%-0.22%.

If Mo is not added on purpose, up to 0.050% Mo may be present as a trace amount. Mo alloying is preferably used in combination with V and Nb, as Mo alloying enhances the strengthening effect of V and Nb.

Aluminum Al May be Used in the Range of 0%-0.15%.

Al is used as a deoxidizing element in the metallurgy. Too high Al levels may decrease formability and weldability by formation of aluminium oxides. In order to prevent excess of aluminium oxide formation in the melt, Al-levels greater than 0.070% should be avoided.

Al may be used in the range of 0%-0.15%. Preferably, Al may be used in the range of 0.015%-0.070%. In the case where the current steel is electric resistance welded, the aluminum content may be at most 0.045%.

Niobium Nb May be Used in the Range of 0%-0.10%.

Nb contributes to strengthening and toughening of steels through precipitations and grain refinement. However, excess Nb may deteriorate bendability and average hole expansion ratio. Nb increases strength and reduces grain size.

Nb is especially needed when Mn+Cr>1% to accelerate phase transformation to polygonal ferrite. When Mn+Cr>1%, the amount of Nb may be >0.006%. However, when Mn+Cr<1%, Nb may not be needed to accelerate phase transformation of polygonal ferrite.

Nb is used in the range of 0%-0.10%, preferably 0%-0.060% and more preferably 0.010%-0.060%.

In case Nb is not intentionally alloyed, such as present as a trace amount, the required strength may be achieved with other alloying elements, such as V and/or Ti. In this case Nb content is less than 0.010% and preferably less than 0.0050%.

If Nb is intentionally alloyed, the Nb content of the steel may be in the range of 0.0060%-0.050%. Preferably, Nb may be used in the range of 0.0060%-0.040% and more preferably 0.0060%-0.025%. At levels below 0.0060% the impact of Nb on strength may be unreliable and merely causes deviation to strength levels.

Vanadium V is Used in the Range of 0.10%-0.30%.

V provides precipitation strengthening. The precipitation strengthening based on fine V containing carbide and/or carbo-nitride precipitates is important to achieve desired strength levels. Further, V is present mostly in vanadium carbides (VC), i.e. VC precipitation strengthening when N levels are low. The average size of VC precipitates may be <10 nm and preferably <6 nm.

V is in the range of 0.10%-0.30%. V is used in the range of 0.10%-0.25% and more preferably 0.10%-0.22%.

Titanium Ti is Used in the Range<0.020%.

Ti may provide precipitation strengthening and prevent aging by binding free nitrogen in the steel but Ti is an optional alloying element in the present steels. Ti may be present as a trace amount if it is not intentionally alloyed.

Ti is used in the range of <0.020%, preferably <0.015% and more preferably <0.010% and even more preferably <0.0080%. In certain cases, the Ti content may be 0.0050%-0.020% in order to limit grain growth in heat affected zone (HAZ) during welding of the present steels.

Boron B May be Used in the Range of 0%-0.0010%.

B increases the strength and hardenability of the material. An excessive amount may however deteriorate the formability.

B may be used in the range of 0%-0.0010%. Preferably, B may be used in the range of 0%-0.00050%.

The product as disclosed herein will have a predominantly ferritic structure comprising, in terms of volume percentages (vol. %), ferrite≥90%, preferably ≥95%, more preferably ≥98%, wherein the ferrite structure comprises at most 15% of quasi-polygonal ferrite, and preferably at most 10% of quasi-polygonal ferrite, the remainder comprising polygonal ferrite and/or bainite. Furthermore the ferrite may comprise at least 1%, preferably at least 2% and more preferably at least 3% of quasi-polygonal ferrite. Ferrite is a soft phase, but it may be strengthened via precipitation strengthening with for example V. Ferrite has good formability, resulting in, for example, good hole expansion ratio, and when it has been strengthened it forms an excellent steel product. The amount of quasi-polygonal ferrite is important for the properties of the steel product.

Preferably, the ferrite may comprise less than 10% of quasi-polygonal ferrite and more than 50% of polygonal ferrite and more preferably more than 80% of polygonal ferrite. The microstructure may also comprise bainite in amounts of less than 10% and preferably less than 5%.

The microstructure of the steel product may apart from ferrite comprise up to 10% of other phases and structures, such as pearlite, Martensite/Austenite (M/A) islands and/or cementite, such that the total content adds up to 100%.

The grain structure is not completely elongated i.e. "pancaked" and close to elliptic, but not fully equiaxed either. The steel strip product has a ferrite grain structure, wherein the ferrite grain structure may have an aspect ratio in the range of 1-2, preferably 1-1.5.

Too much Nb and Mo in the alloy may lead to elongation of prior austenite grains which may lead to decreasing of average hole expansion ratio values.

Quasi-Polygonal Ferrite Characteristics

Some quasi-polygonal ferrite may be present in the steels disclosed herein. The microstructure of quasi-polygonal ferrite is characterized by relatively coarse ferrite grains whose boundaries are both irregular and undulating. The structure often shows clearly detectable etching evidence containing a dislocation sub-structure. The quasi-polygonal ferrite transformation during continuous cooling takes place below the temperature range for polygonal ferrite, roughly between 610-670° C. Similarly as polygonal ferrite, the prior austenite boundaries are eliminated in quasi-polygonal ferrite. Because the parent austenite and the product ferrite involved in massive transformation ideally have the same composition, the transformation can be accomplished by the short-range diffusion across transformation interfaces. However, interstitial or substitutional atom partitioning may occur at the migrating interfaces causing the irregular growth and jagged boundaries of quasi-polygonal ferrite (massive ferrite).

The steel product disclosed herein may have an average ferrite grain size of <10 μm. The average size of the ferrite grain size may be <8 μm, preferably <4 μm. Smaller grain size generally improves the strength of the steel product.

The steel product with the targeted mechanical properties is produced in a process that results in the production of a specific microstructure which in turn dictates the mechanical properties of the steel product.

Figure 1:
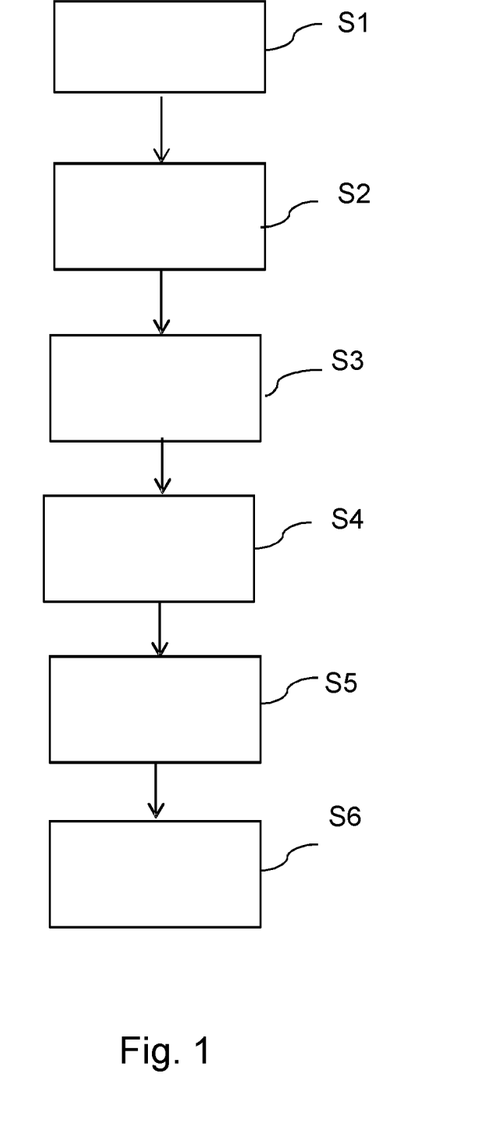
FIG. 1 is a flowchart illustrating the method of the invention.

A method for manufacturing the steel product according to the first aspect of the invention is illustrated in FIG. 1, which schematically shows the method steps. The method comprises the steps S1-S6 described below.

S1: providing a steel slab having the chemical composition as disclosed herein. This may be achieved by means of, for instance, a process of continuous casting, also known as strand casting.

S2: heating the steel slab to the austenitizing temperature of 1200-1350° C. The heating temperature should be high enough to dissolve precipitates, such as Ti/Nb base precipitates for example. Too low heating temperature may result in large amounts of undissolved precipitates leading to low strength. Further, too high heating temperature may increase grain growth and excessive scale forming.

S3: hot-rolling to the desired thickness at a temperature in the range of Ar3-1300° C., wherein the finish rolling temperature (FRT) is in the range of 850-1050° C., preferably 910-980° C., more preferably 930-970° C. A hot-rolled steel strip is thereby obtained. The rolling speed may depend on the strip thickness. Thinner gauges are normally rolled with faster speed. Rolling speed also depends on rolling equipment and rolling line length.

A preferred maximum FRT may be estimated using the following formula:

$$Tfmax = 1071,50 - 7,943*t - 149,61*Si + 90,14*Si^2$$

wherein t is the thickness of the steel strip and Si is the silicon content of the steel in weight percent. This equation has been determined assuming a hot rolling mill entry temperature of 1080° C. This has been calculated for thickness 1.5 to 6 mm.

S4: air cooling for 0.5-15 seconds, preferably 1-10 seconds. In some embodiments, the air cooling time may be at least 2 and more preferably at least 3 seconds. This time is dependent on the rolling speed. For example, the slower the rolling speed the longer the air cooling time before the accelerated cooling. The longer the air cooling time, the greater is the accelerated cooling rate which needed. This gives more time for both recovery and recrystallization to occur and the faster accelerated cooling rate results in smaller ferrite grain size and optimal precipitate size. This gives the steel great mechanical properties.

The air cooling may be performed before the accelerated cooling step S5.

S5: accelerated cooling to 590-680° C., preferably to 600-640° C. The rapid or accelerated cooling step may be made by water cooling. Thus, the accelerated cooling step may be a water cooling step. The step may be performed as late as possible. This is beneficial for the average hole expansion ratio.

The cooling rate under accelerated cooling may be at least twice as high compared to air cooling. The average cooling rate from finish rolling temperature to coiling temperature may be, for example, around 15° C. The average cooling rate is the combined air and water cooling rate. The cooling rate in the accelerated cooling step S5 may be 25° C./s-350° C./s. In some embodiments, the accelerated cooling rate may be 25-150° C./s and in other embodiments it may be 150-350° C./s. Preferably the cooling rate from the austenite region to the ferrite region is as fast as possible and that the ferrite formation temperature is as low as possible. This enables small ferrite grain size and an optimal precipitation size that in turn result in great mechanical properties.

S6: coiling the hot-rolled strip steel. The coiling temperature in the coiling step S6 may be 560-670° C. The coiling temperature is the strip body temperature. The coiling temperature for the head and tail may be higher than for the body part to prevent strength deterioration due to faster cooling of the head and tail. For example, the head and tail may be left with a higher temperature on the cooling table since those parts will cool faster than the body part when the strip is coiled. Coiling is essential to control strength distribution since even though strip temperature may vary along the length of the strip, these variations level out when the strip is coiled.

In an embodiment, the head and the tail may be cooled to a temperature which is 15-40° C. higher than the temperature to which the body part is cooled. By keeping the head and tail at a higher temperature, a rapid cooling of the head and tail is avoided and a more uniform microstructure may be obtained and thereby more uniform mechanical properties are obtained.

Some fraction of the austenite-to-ferrite-phase transformation may take place before the coiling in step S6, i.e. in the cooling steps. Further, it may be preferred to perform the air cooling step before the accelerated cooling step.

Some fraction of the phase transformations may take place in the coiling step. With a relatively high amount of V the phase transformation from the austenite phase to the ferrite phase may occur at lower temperatures. Therefore the majority of the austenite-to-ferrite phase transformation may occur during the coiling step. In the coiling step the phase transformation may be more uniform.

The cooling step and the coiling step S6 will result in a desired microstructure, which will achieve the excellent properties. The desired microstructure and thereby achieved properties may be part of the alloying. E.g. Mn and Si may suppress formation of ferrite so that the transformation occurs in a later stage.

The cooling may be continuous. The cooling may be performed in one step and the accelerated cooling may be performed with, for example, water cooling.

After the cooling step, i.e. the air cooling step S4 and the accelerated cooling step S5, the steel strip is coiled. The coiling temperature may be the end temperature of the cooling step, or a temperature which is a few ° C. below the end of the cooling temperature. The strip may have been cooled a few degrees after reaching the end of the cooling temperature before coiling.

When the steel strip is cooled to a specific temperature, there may be a temperature drop of, for example, 10-30° C., to the coiling temperature.

The hot-rolled steel may be hot-dip galvanized. In another embodiment, the hot-rolled steel is cold-rolled before galvanizing. It may be continuously hot-dip galvanized. This will improve the corrosion resistance of the steel product.

EXAMPLES

The following examples further describe and demonstrate embodiments within the scope of the present invention. The examples are given solely for the purpose of illustration and are not to be construed as limitations of the present invention, as many variations thereof are possible without departing from the scope of the invention.

The chemical compositions used for producing the tested steel strip products are presented in Table 1.

The manufacturing conditions for producing the tested steel strip products are presented in Table 2. It is preferred to start the accelerated cooling as late as possible to allow recrystallization to occur. If the finish rolling temperature is high, then the accelerated cooling can start sooner. A suitable range for the air cooling time may be 0.5-15 s.

The mechanical properties of the tested steel strip products are presented in Table 3.

Tensile Testing

Tensile testing is performed according to ISO standard SFS_EN-IS06892-1. The test sample is extracted longitudinal to the rolling direction. From the tensile test the yield strength ($Rp_{0.2\%}$), tensile strength (Rm) and total elongation ($A_t$) are established.

Yield Strength

Each one of the inventive examples no. 1-6 has an average value of yield strength ($Rp_{0.2\%}$) in the range of 709 MPa to 771 MPa, measured in the longitudinal direction (Table 3).

Tensile Strength

Each one of the inventive examples no. 1-6 has an average value of ultimate tensile strength (Rm) in the range of 781 MPa to 861 MPa, measured in the longitudinal direction (Table 3).

Elongation

The value of total elongation of the inventive examples no. 1-6 is in the range of 16.2% to 22% (Table 3).

Hole Expansion Ratio

The hole-expansion test is performed in accordance with the ISO 16630 standard. In the test, a 10 mm hole is punched in the material with a 12% cutting clearance. A conical mandrel is pushed through the hole of the clamped down test piece until a through thickness crack is identified, upon which the test is stopped. The diameter of the hole is measured and correlated to the original diameter and the result is expressed in a percentage difference. The initial diameter $d_0$ of the hole of the test sample is measured. When a tear is observed the movement of the punch is stopped and the diameter $d_f$ of the hole is measured. The hole expansion ratio, $\lambda$, is calculated using the following equation:

$$\lambda = \frac{d_f - d_0}{d_0} \cdot 100\%.$$

The test is conducted three times and an average value is calculated, which represents the average hole-expansion result. The specimens for the hole expansion test were taken from the body part of a strip.

The average value of total hole expansion ratio of the inventive examples no. 1-6 is in the range of 79.6% to 115% (Table 3).

Microstructure Characterization

Typical strip body part quarter-thickness microstructures were studied on a section containing the rolling direction (RD) and the normal direction (ND). Microstructures were characterized with both Field Emission Scanning Electron Microscopy (FESEM) and Electron BackScatter Diffraction (EBSD). The scanning electron microscope used for the microstructure characterization and for the EBSD measurements was a JEOL JSM-7000F field emission scanning electron microscope (FESEM) and EBSD Nordlys system by Oxford Instruments.

Figure 2:
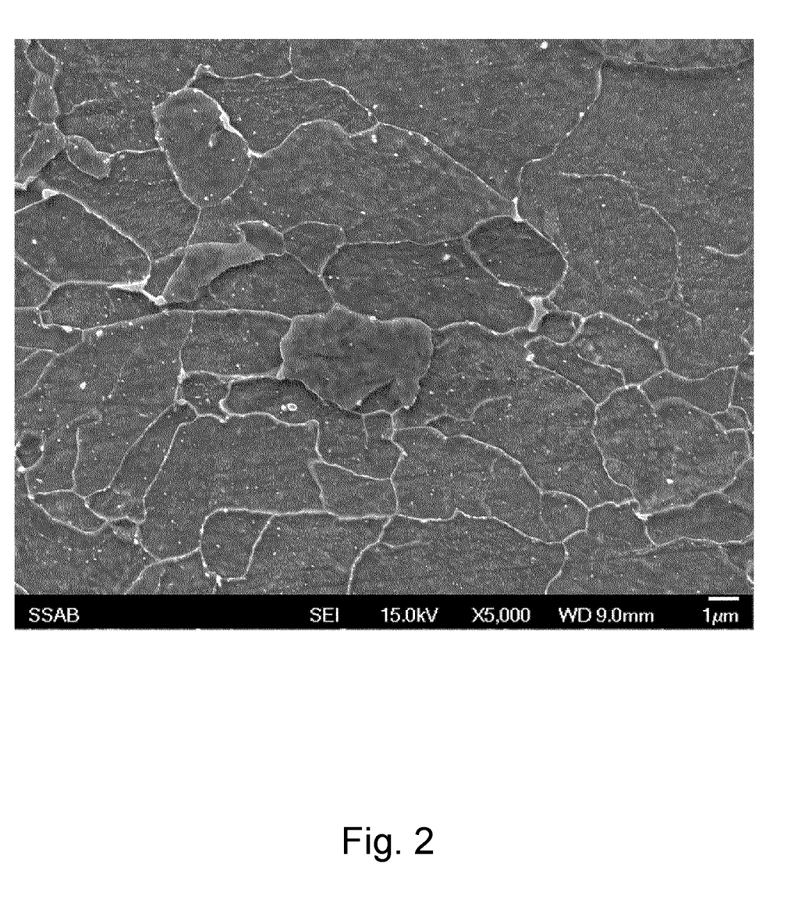
FIG. 2 is a micrograph obtained via a scanning electron microscope from a ¼ thickness of the body part a strip steel product according to an embodiment of the invention.

In FIG. 2, a micrograph (SEM micrograph) is disclosed. FIG. 2 illustrates typical bulk microstructure features of the steel product. The main ferrite morphologies are classified as polygonal ferrite and irregular shaped quasi-polygonal ferrite, respectively. In particular, the presence of small grain polygonal ferrite is characteristic of this precipitation-strengthened steel product. Furthermore, the amounts of pearlite, carbon enriched areas and MA-constituents are minimal as seen in FIG. 2. Another typical feature of this fine grained steel product microstructure is the lack of prior-austenite grain boundaries in the structure. This is mainly due to the formation of polygonal ferrite.

Sample Preparation

The SEM characterization work was conducted on cross sections parallel to the applied rolling direction (RD-ND plane). Samples were mounted in a conductive resin and mechanically polished to 1 µm. The final polishing step was conducted with MD-Chem polishing cloth and non-drying 0.04 µm colloidal silica suspension using 10 N force and 120 s polishing time. Finally, specimens were etched in 2% Nital.

The EBSD characterization work was conducted on cross sections parallel to the applied rolling direction (RD-ND plane). Samples were mounted in a conductive resin and mechanically polished to 1 µm. The final polishing step was conducted with MD-Chem polishing cloth and non-drying 0.04 µm colloidal silica suspension using 10 N force and 900 s polishing time.

IL=intercept length
RD=rolling direction=strip length direction
ND=normal direction=strip thickness direction
Aspect ratio=IL RD/IL ND The measurement results indicate that a typical aspect ratio of the present steel is 1-2.0.

Grain Size Measurements $GS_F$ is measured average grain size of phase (ferrite).

Grain structures and morphology were investigated using EBSD maps and linear intercept method. The mean grain sizes $\overline{L}_{RD}$ (rolling direction) and $\overline{L}_{ND}$ (normal to rolling direction) were measured using crystallographic orientation data rather than a processed image from an etched specimen in order to avoid ambiguity about the grain boundaries. The applied critical misorientation angle to define a grain boundary was 15°. The mean linear intercept value was calculated by adding all the line segments together and dividing by the number of complete grains that the test lines passed through. Incomplete intercepts (map edge grains) were not included in the statistics.

The measurement results indicate that the average ferrite grain size is <10 µm.

Quasi-Polygonal Ferrite Fraction Measurements

The microstructure of quasi-polygonal ferrite is characterized by relatively coarse ferrite grains whose boundaries are both irregular and undulating and structure often show clear detectable etching evidence containing a dislocation sub-structure.

Measurement of volume fraction of quasi-polygonal ferrite was made from planar sections by using SEM micrographs taken from quarter thickness and point counting method. A complete grid of points was drawn and points were registered to obtain the number of points in quasi-polygonal ferrite. Finally, the fraction of quasi-polygonal ferrite was obtained by dividing the number of points in quasi-polygonal ferrite by the total number of grid points.

The inventive examples no. 1 to 6 have an average value of the hole expansion ratio above 50% which can be seen in table 3. It can also be seen that the yield strength of the inventive examples have a value above 660 MPa. Further, the inventive examples have a tensile strength above 760 MPa which can also be seen in Table 3.

TABLE 1

CHEMICAL COMPOSITIONS (wt. %)

| Steel | C | Si | Mn | P | S | N | Cr | Ni | Cu | Mo | Al | Nb | V | Ti | B | Remarks |
|---|---|---|---|---|---|---|---|---|---|---|---|---|---|---|---|---|
| 1 | 0.067 | 0.493 | 1.590 | 0.007 | 0.001 | 0.004 | 0.060 | 0.100 | 0.010 | 0.205 | 0.038 | 0.030 | 0.191 | 0.004 | 0.0003 | Inv ex |
| 2 | 0.071 | 0.510 | 1.620 | 0.016 | 0.002 | 0.003 | 0.024 | 0.035 | 0.009 | 0.199 | 0.045 | 0.029 | 0.188 | 0.004 | 0.0004 | Inv ex |
| 3 | 0.060 | 0.518 | 1.610 | 0.012 | 0.002 | 0.004 | 0.019 | 0.034 | 0.007 | 0.201 | 0.045 | 0.015 | 0.193 | 0.004 | 0.0004 | Inv ex |
| 4 | 0.078 | 0.508 | 1.66 | 0.012 | 0.002 | 0.004 | 0.024 | 0.038 | 0.009 | 0.201 | 0.043 | 0.017 | 0.2 | 0.004 | 0.0004 | Inv ex |
| 5 | 0.059 | 0.16 | 1.71 | 0.009 | 0.0022 | 0.0045 | 0.04 | 0.035 | 0.17 | 0.15 | 0.031 | 0.056 | 0.20 | 0.001 | 0 | Inv ex |
| 6 | 0.067 | 0.14 | 1.70 | 0.013 | 0.0017 | 0.0035 | 0.05 | 0.035 | 0.18 | 0.14 | 0.029 | 0.054 | 0.24 | 0.001 | 0 | Inv ex |
| 7 | 0.075 | 0.16 | 2.13 | 0.010 | 0.0017 | 0.0047 | 0.04 | 0.039 | 0.17 | 0.15 | 0.027 | 0.041 | 0.23 | 0.001 | 0 | Comp ex |
| 8 | 0.075 | 0.16 | 2.13 | 0.010 | 0.0017 | 0.0047 | 0.04 | 0.039 | 0.17 | 0.15 | 0.027 | 0.041 | 0.23 | 0.001 | 0 | Comp ex |

TABLE 2

ROLLING PARAMETERS

| Steel | Strip thickness [mm] | FRT [° C.] | CT [° C.] | Remarks |
|---|---|---|---|---|
| 1 | 3 | 936 | 617 | Inv ex |
| 2 | 3 | 952 | 618 | Inv ex |
| 3 | 3 | 945 | 628 | Inv ex |
| 4 | 3 | 940 | 626 | Inv ex |
| 5 | 3 | 939 | 628 | Inv ex |
| 6 | 3 | 933 | 616 | Inv ex |
| 7 | 3 | 931 | 628 | Comp ex |
| 8 | 3 | 933 | 350/150 | Comp ex |

TABLE 3

MECHANICAL PROPERTIES

| Steel | YS (MPa) | UTS (MPa) | YS/UTS (%) | TE (%) | HER (%) | Remarks |
|---|---|---|---|---|---|---|
| 1 | 771 | 861 | 0.90 | 20 | 91 | Inv ex |
| 2 | 709 | 793 | 0.89 | 22 | 85 | Inv ex |
| 3 | 709 | 781 | 0.91 | 19 | 115 | Inv ex |
| 4 | 730 | 815 | 0.89 | 20.6 | 107 | Inv ex |
| 5 | 715 | 786 | 91 | 16.2 | 79.6 | Inv ex |
| 6 | 716 | 815 | 88 | 16.9 | 82.0 | Inv ex |
| 7 | 580 | 700 | 83 | 18.9 | 76.4 | Comp ex |
| 8 | 960/962 | 1082/1099 | 89/88 | 6.8/7.1 | 49.1 | Comp ex |

The invention claimed is:

1. A hot-rolled strip steel product having a chemical composition consisting of, in terms of weight percentages (wt. %):
C 0.030-0.10,
Si 0-1.10,
Mn 0.50-2.0,
P 0-<0.020,
S 0-<0.010,
N 0-<0.010,
Cr 0-0.60,
Ni 0-0.20,
Cu 0-0.25,
Mo 0-0.30,
Al 0-0.15,
Nb 0-0.10,
V 0.10-0.30,
Ti 0-<0.020,
B 0-0.0010,
remainder being Fe and inevitable impurities, wherein the hot rolled strip steel product has a microstructure comprising, in terms of volume percentages (vol. %), ferrite≥90, wherein the ferrite structure comprises in terms of volume percentages (vol. %): i) bainite in an amount of less than 10%, ii) at least 50% of polygonal ferrite, and iii) at most 10% quasi-polygonal ferrite, and wherein the steel strip product has an average hole expansion ratio≥50%,
a yield strength ($Rp_{0.2\%}$) longitudinal to rolling direction of ≥660 MPa, and
a tensile strength≥760 MPa.

2. The steel product according to claim 1, wherein the steel strip product has an average ferrite grain size<10 μm.

3. The steel product according to claim 1, wherein the amount of Ti is ≥0.0050% and <0.020%.

4. The steel product according to claim 1, wherein the steel product has an average hole expansion ratio of ≥60% and/or a tensile strength of ≥790 MPa.

5. The steel product according to claim 1, wherein the product has a yield strength ($Rp_{0.2\%}$) longitudinal to the rolling direction of ≥700 MPa.

6. The steel product according to claim 1, wherein the steel product has a thickness of 1.5-8.0 mm.

7. The steel product according to claim 1, wherein the sum of Si, Mn, Ni and Cr is in the range of 1.5%-2.5%.

8. The steel product according to claim 1, wherein the sum of Nb, V and Ti is 0.15%-0.35%.

9. The steel product according to claim 1, wherein the carbon amount is $$C \leq a + Nb*(12.01/92.91) + V*(12.01/50.94) + Ti*(12.01/47.87) + Mo*(0.5*(12.01/95.94))$$

wherein all elements are in weight percentages (wt %) and constant a is tolerance for carbon, wherein the tolerance a is 0.035.

10. The steel product according to claim 1, wherein the carbon amount is $$C > Nb*(12.01/92.91) + V*(12.01/50.94) + Ti*(12.01/47.87) + Mo*(0.5*12.01/95.94) - b,$$

wherein all elements are in weight percentages (wt %) and constant b is tolerance for carbon, wherein the tolerance b is 0.015.

11. The steel product according to claim 1, wherein the average size of VC precipitates is <10 nm.

12. The steel product according to claim 1, wherein the ferrite structure of the microstructure comprises, in terms of volume percentage, more than 80% polygonal ferrite.

13. The steel product according to claim 1, wherein the steel product is galvanized.

14. A method for manufacturing the steel strip according to claim 1 comprising the following steps of
S1: providing a steel slab having the chemical composition according to claim 1;

S2: heating the steel slab to the austenitizing temperature of 1200-1350° C.;

S3: hot-rolling the steel slab to hot-rolled strip with a desired thickness at a temperature in the range of Ar3-1300° C., wherein the finish rolling temperature of the hot-rolled strip is in the range of 850-1050° C., S4: air cooling the hot-rolled strip for 0.5-15 s from the finish rolling temperature to a temperature in the range of 850-1050° C., S5: accelerated cooling of the air cooled hot-rolled strip to 590-680° C., wherein a cooling rate of the accelerated cooling is at least twice a cooling rate of air cooling the air cooled hot-rolled strip to 590-680° C.; and S6: coiling the accelerated cooled hot-rolled strip.

15. The method according to claim 14, wherein the accelerated cooling is continuous.

* * * * *